(12) United States Patent
Ueyama (10) Patent No.: US 8,634,027 B2
(45) Date of Patent: Jan. 21, 2014

(54) VIDEO SIGNAL PROCESSING APPARATUS, ENHANCEMENT GAIN GENERATING METHOD, AND ENHANCED GAIN GENERATING PROGRAM

(75) Inventor: Akihiro Ueyama, Tokyo (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 12/846,168

(22) Filed: Jul. 29, 2010

(65) Prior Publication Data

US 2011/0037901 A1 Feb. 17, 2011

(30) Foreign Application Priority Data

Aug. 11, 2009 (JP) ................................. 2009-186923

(51) Int. Cl.
*H04N 5/21* (2006.01)
(52) U.S. Cl.
USPC ............ 348/630; 348/625; 382/263; 382/266
(58) Field of Classification Search
USPC ........................... 348/630, 647–690; 382/264
See application file for complete search history.

(56) References Cited

U.S. PATENT DOCUMENTS

| | | | | | |
|---|---|---|---|---|---|
| 5,099,330 | A | * | 3/1992 | Fuse et al. ..................... | 348/678 |
| 5,394,194 | A | * | 2/1995 | Izawa et al. .................... | 348/672 |
| 5,808,697 | A | * | 9/1998 | Fujimura et al. ............... | 348/672 |
| 5,870,154 | A | * | 2/1999 | Conover et al. ................ | 348/673 |
| 6,633,683 | B1 | * | 10/2003 | Dinh et al. ..................... | 382/260 |
| 6,856,704 | B1 | * | 2/2005 | Gallagher et al. ............. | 382/263 |
| 6,992,729 | B2 | * | 1/2006 | Shirata et al. ................. | 348/673 |
| 7,102,697 | B2 | * | 9/2006 | Lei et al. ....................... | 348/678 |
| 7,454,137 | B2 | * | 11/2008 | Lee et al. ....................... | 396/282 |
| 7,773,158 | B2 | * | 8/2010 | Yamashita et al. ............. | 348/678 |
| 8,085,323 | B2 | * | 12/2011 | Tanaka et al. .................. | 348/254 |
| 2002/0135743 | A1 | * | 9/2002 | Gindele .......................... | 355/18 |
| 2007/0154107 | A1 | * | 7/2007 | Jang .............................. | 382/266 |
| 2007/0171310 | A1 | * | 7/2007 | Arici et al. ..................... | 348/687 |
| 2009/0021601 | A1 | * | 1/2009 | Tanaka et al. ................. | 348/222.1 |
| 2009/0026495 | A1 | * | 1/2009 | Chu et al. ...................... | 257/190 |
| 2009/0167956 | A1 | * | 7/2009 | Miyazawa ..................... | 348/672 |
| 2010/0302449 | A1 | * | 12/2010 | Chen et al. .................... | 348/687 |

FOREIGN PATENT DOCUMENTS

| | | |
|---|---|---|
| JP | 2007-318313 | 12/2007 |
| JP | 2007318313 A * | 12/2007 |

* cited by examiner

*Primary Examiner* — Jefferey Harold
*Assistant Examiner* — Humam Satti
(74) *Attorney, Agent, or Firm* — Oblon, Spivak, McClelland, Maier & Neustadt, L.L.P.

(57) ABSTRACT

A video signal processing apparatus includes: an enhancement gain generating section obtaining an enhancement gain for each pixel based on an luminance signal forming part of an input video signal and a predetermined enhancement gain; and an enhancing section performing a process of enhancing the luminance signal forming part of the input video signal based on the enhancement gain. The enhancement gain generating section includes a mean deviation calculating portion obtaining a mean deviation of luminance values of pixels included in a predetermined region centered at a pixel of interest that is the pixel for which the enhancement gain is to be obtained, a weighting coefficient generating portion generating a weighting coefficient for the pixel of interest according to the value of the mean deviation, and a multiplication portion multiplying the predetermined enhancement gain by the weighting coefficient to obtain the enhancement gain for the pixel of interest.

5 Claims, 8 Drawing Sheets

FIG.9A  Y
FIG.9B  Y1d
FIG.9C  Y2d
FIG.9D  Y+Y2d
FIG.9E  Senh

FIG.10

VIDEO SIGNAL PROCESSING APPARATUS, ENHANCEMENT GAIN GENERATING METHOD, AND ENHANCED GAIN GENERATING PROGRAM

BACKGROUND OF THE INVENTION

1. Field of the Invention

The present invention relates to a video signal processing apparatus, an enhancement gain generating method, and an enhancement gain generating program. More particularly, the invention relates to a video signal processing apparatus or the like which performs an enhancement process on a luminance signal to improve the sharpness of an image.

2. Description of the Related Art

Television receivers, video tape players, and DVD players in the related art have an enhancement function for improving the sharpness of an image, and a user can adjust an enhancement gain (enhanced amount) obtained by the function. However, an enhancement gain obtained by an adjustment stays fixed regardless of the content of an image. As a result, noises may be undesirably emphasized, for example, in flat signal regions, and a resultant image may have low quality.

There are enhancing techniques involving coring which employ a circuit performing no enhancement on noises having small amplitudes. However, since signals cannot be distinguished from noises, a problem arises in that enhancement is disabled also for small amplitudes or details of an image having no noise.

For example, JP-A-2007-318313 (Patent Document 1) discloses a proposed approach including the steps of calculating a histogram, detecting areas where the histogram shows significant changes as flat regions, and reducing the value of an enhancement gain in such flat regions. However, such an approach has problems when used for real-time processing, including the need for calculating a histogram of each screen in advance.

SUMMARY OF THE INVENTION

As described above, since an enhancing function according to the related art provides an enhancement gain obtained to be an adjustment which is fixed regardless of the content of an image, an enhancement process may emphasize noises in, for example, in flat regions, thereby degrading image quality.

It is desirable to allow an enhancement process to be properly performed by generating an enhancement gain appropriate for each region of an image such noises will not be emphasized in, for example, flat regions of the image.

According to an embodiment of the invention, there is provided a video signal processing apparatus including an enhancement gain generating section obtaining an enhancement gain for each pixel based on an luminance signal forming part of an input video signal and a predetermined enhancement gain and an enhancing section performing a process of enhancing the luminance signal forming part of the input video signal based on the enhancement gain for each pixel obtained by the enhancement gain generating section.

The enhancement gain generating section includes a mean deviation calculating portion obtaining a mean deviation of luminance values of a plurality of pixels included in a predetermined region centered at a pixel of interest that is the pixel for which the enhancement gain is to be obtained, a weighting coefficient generating portion generating a weighting coefficient for the pixel of interest according to the value of the mean deviation calculated by the mean deviation calculating portion, and a multiplication portion multiplying the predetermined enhancement gain by the weighting coefficient generated by the weighting coefficient generating portion to obtain the enhancement gain for the pixel of interest.

In the embodiment of the invention, an enhancement gain for each pixel is obtained by the enhancement gain generating section based on a luminance signal forming part of an input video signal and a predetermined enhancement gain. The enhancing section performs a process of enhancing the luminance signal based on the enhancement gain generated by the enhancement gain generating section.

The enhancement gain generating section includes the mean deviation calculating portion, the weighting coefficient generating portion, and the multiplication portion. The mean deviation calculating portion obtains a mean deviation of luminance values of a plurality of pixels included in a predetermined region centered at a pixel of interest that is the pixel for which the enhancement gain is to be obtained. The weighting coefficient generating portion generates a weighting coefficient for the pixel of interest according to the value of the mean deviation calculated by the mean deviation calculating portion. The multiplication portion multiplies the predetermined enhancement gain by the weighting coefficient generated by the weighting coefficient generating portion to obtain the enhancement gain for the pixel of interest.

As apparent from the above description, the enhancement gain for each pixel is obtained by controlling the predetermined enhancement gain on a real-time basis according to the mean deviation of luminance values of a plurality of pixels included in a predetermined region centered at the pixel. For example, an enhancement gain for a pixel in a flat region is small because such a region has a small mean deviation and a small weighting coefficient is therefore applied to the region.

According to the embodiment of the invention, the enhancement gain generating section may include a color region detecting portion detecting a region of a particular color based on a color signal forming part of the input video signal and an output selecting portion picking up and outputting the enhancement gain obtained by the multiplication portion for the region of a particular color and picking up and outputting the predetermined enhancement gain for a region other than the region of a particular color, depending on a detection signal from the color region detecting portion.

In this case, the enhancement gain obtained by the multiplication portion is picked up and output for the region of a particular color. Therefore, an enhancement process will not be uselessly performed in a region which has a particular color and which is flat. For example, when the region of a particular color is a blue region such as a flat region representing blue sky, noises are prevented from being emphasized by an enhancement process.

According to the embodiment of the invention, the enhancement gain generating section may further include a smoothing portion smoothing the mean deviation calculated by the mean deviation calculating portion in the horizontal direction and the vertical direction. The weighting coefficient generating portion may generate the enhancement gain for the pixel of interest according to the value of the mean deviation smoothed by the smoothing portion. In this case, even when the mean deviation obtained by the mean deviation calculating portion changes abruptly, such a change is suppressed by being smoothed, and a change in the enhancement gain obtained by the multiplication portion can be also suppressed. Thus, operations of the circuit associated with the enhancement process can be performed in a stable manner.

According to the embodiment of the invention, the enhancement gain for each pixel is obtained by controlling the predetermined enhancement gain on a real-time basis according to the mean deviation of luminance values of a plurality of pixels included in a predetermined region centered at the pixel. It is therefore possible to prevent noises from being emphasized by an enhancement process in a flat region.

DESCRIPTION OF PREFERRED EMBODIMENTS

A mode for implementing the invention (hereinafter referred to as embodiment) will now be described below in the following order.
1. Embodiment
2. Variation 1. Embodiment

[Configuration of Television Receiver]

Figure 1:
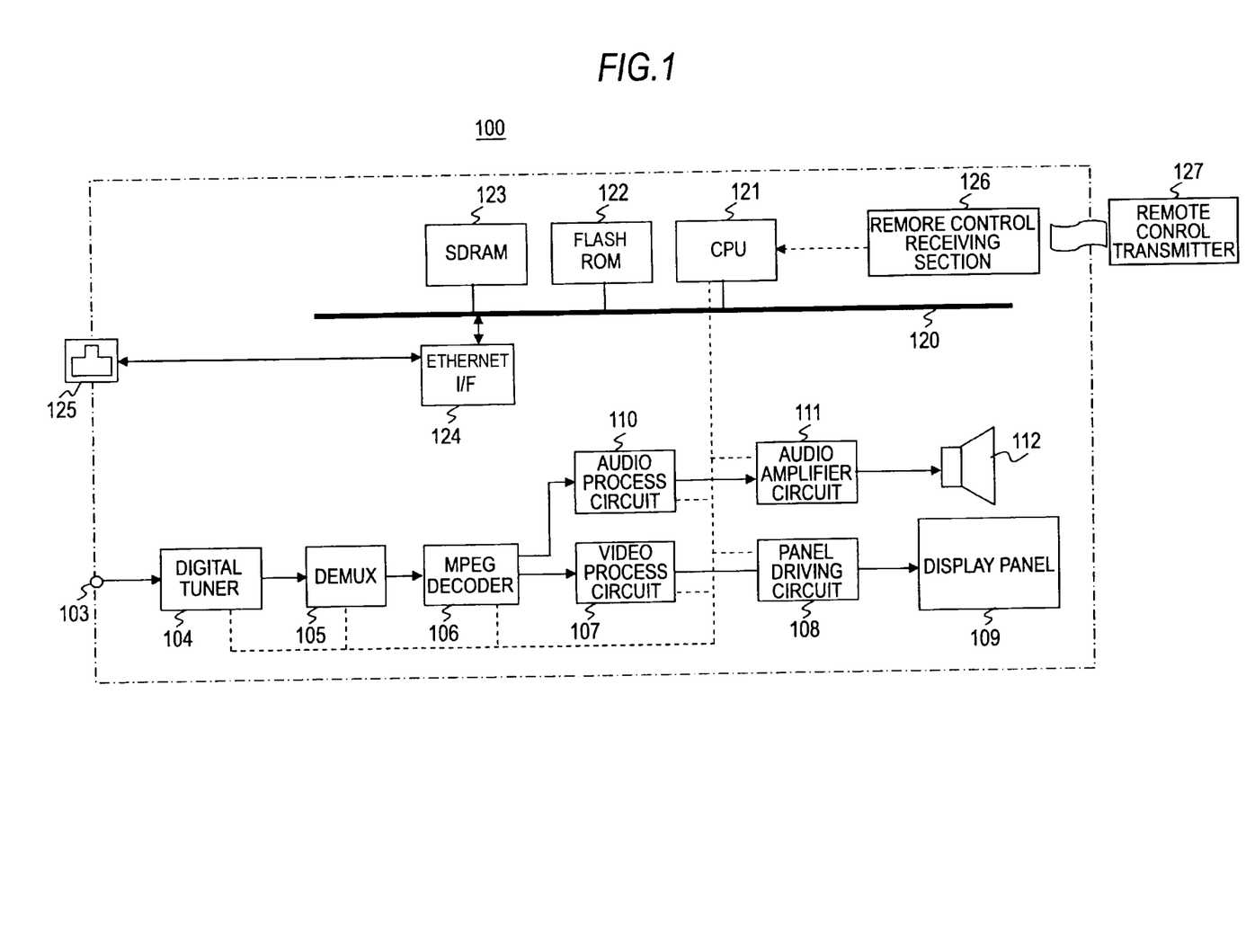
FIG. 1 is a block diagram showing an exemplary configuration of a television receiver according to an embodiment of the invention.

FIG. 1 shows an exemplary configuration of a television receiver 100 which is an embodiment of the invention. The television receiver 100 includes an antenna terminal 103, a digital tuner 104, a demultiplexer 105, and an MPEG decoder 106. The television receiver 100 also includes a video process circuit 107, a panel driving circuit 108, a display panel 109, an audio process circuit 110, an audio amplifier circuit 111, and a speaker 112.

The television receiver 100 further includes an internal bus 120, a CPU (central processing unit) 121, a flash ROM (read only memory) 122, and an SDRAM (synchronous DRAM) 123. The television receiver 100 also includes an Ethernet interface 124, a network terminal 125, a remote control receiving section 126, and a remote control transmitter 127. "Ethernet" is a registered trademark.

The antenna terminal 103 is a terminal to which television broadcast signals received by a reception antenna (not shown) are input. The digital tuner 104 processes the television broadcast signals input to the antenna terminal 103 to output a predetermined transport stream associated with channels selected by a user. The demultiplexer 105 extracts a partial transport stream (partial TS) associated with a channel selected by the user from the transport stream obtained by the digital tuner 104. The partial transport stream includes TS packets of video data and TS packets of audio data.

The demultiplexer 105 extracts PSI/SI (program specific information/service information) from the transport stream obtained by the digital tuner 104 and outputs the information to the CPU 121. The transport stream obtained by the digital tuner 104 includes a plurality of channels which are multiplexed. The demultiplexer 105 is enabled for the process of extracting a partial TS of an arbitrary channel from the transport stream performed by obtaining information on the packet ID (PID) of the channel from the PSI/SI (PAT/PMT).

The MPEG decoder 106 obtains video data (video signals) by decoding video PES (packetized elementary stream) packets formed from TS packets of video data obtained by the demultiplexer 105. The MPEG decoder 106 also obtains audio data (audio signals) by decoding audio PES packets formed from TS packets of audio data obtained by the demultiplexer 105.

The video process circuit 107 performs required processes on video data obtained by the MPEG decoder 106, the processes including the elimination of dot crawl interference and cross color interference, IP (interlace/progressive) conversion, scaling, enhancement, and graphics data superimposition.

The panel driving circuit 108 drives the display panel 109 based on video data output from the video process circuit 107. For example, the display panel 109 may be an LCD (liquid crystal display) or a PDP (plasma display panel). The audio process circuit 110 performs required processes such as a sound quality adjusting process and a D-A conversion process on audio data obtained by the MPEG decoder 106. The audio amplifier circuit 111 amplifies audio signals output from the audio process circuit 110 and supplies resultant signals to the speaker 112.

The CPU 121 controls operations of various parts of the television receiver 100. The flash ROM 122 is provided for storing control programs and for saving data. The SDRAM 123 serves as a work area of the CPU 121. The CPU 121 deploys programs and data read from the flash ROM 122 on the SDRAM 123 and activates the programs to control various parts of the television receiver 100.

The remote control receiving section 126 receives remote control signals (remote control codes) transmitted from the remote control transmitter 127 and supplies the signals to the CPU 121. The CPU 121 controls various parts of the television receiver 100 based on the remote control codes. The network terminal 125 is a terminal to be connected to a network, and the terminal is connected to the Ethernet interface 124. The CPU 121, the flash ROM 122, the SDRAM 123, and the Ethernet interface 124 are connected to the internal bus 120.

Operations of the television receiver 100 shown in FIG. 1 will now be briefly described. Television broadcast signals input to the antenna terminal 103 are supplied to the digital tuner 104. The digital tuner 104 processes the television broadcast signals to output a predetermined transport stream associated with a channel selected by the user. The predetermined transport stream is supplied to the demultiplexer 105. The demultiplexer 105 extracts a partial transport stream (TS packets of video data and TS packets of audio data) associated with the channel selected by the user from the transport stream. The partial transport stream is supplied to the MPEG decoder 106.

The MPEG decoder 106 decodes video PES packets formed from the TS packets of video data to obtain video data. The video data are supplied to the video process circuit 107. At the video process circuit 107, the video data are subjected to processes such as a process of eliminating dot crawl interference components and cross color interference components, an IP conversion process, scaling, enhancement, and a process of superimposing graphics data. The processed video data are supplied to the panel driving circuit 108. Thus, images associated with the channel selected by the user are displayed on the display panel 109.

The MPEG decoder 106 decodes audio PES packets formed from TS packets of audio data to obtain audio data. The audio data are subjected to processes such as a sound quality adjusting process and a D-A conversion process at the audio process circuit 110. The audio data are amplified by the audio amplifier circuit 111 and are thereafter supplied to the speaker 112. Thus, sounds associated with the channel selected by the user are output from the speaker 112.

[Exemplary Configuration of Video Process Circuit]

Figure 2:
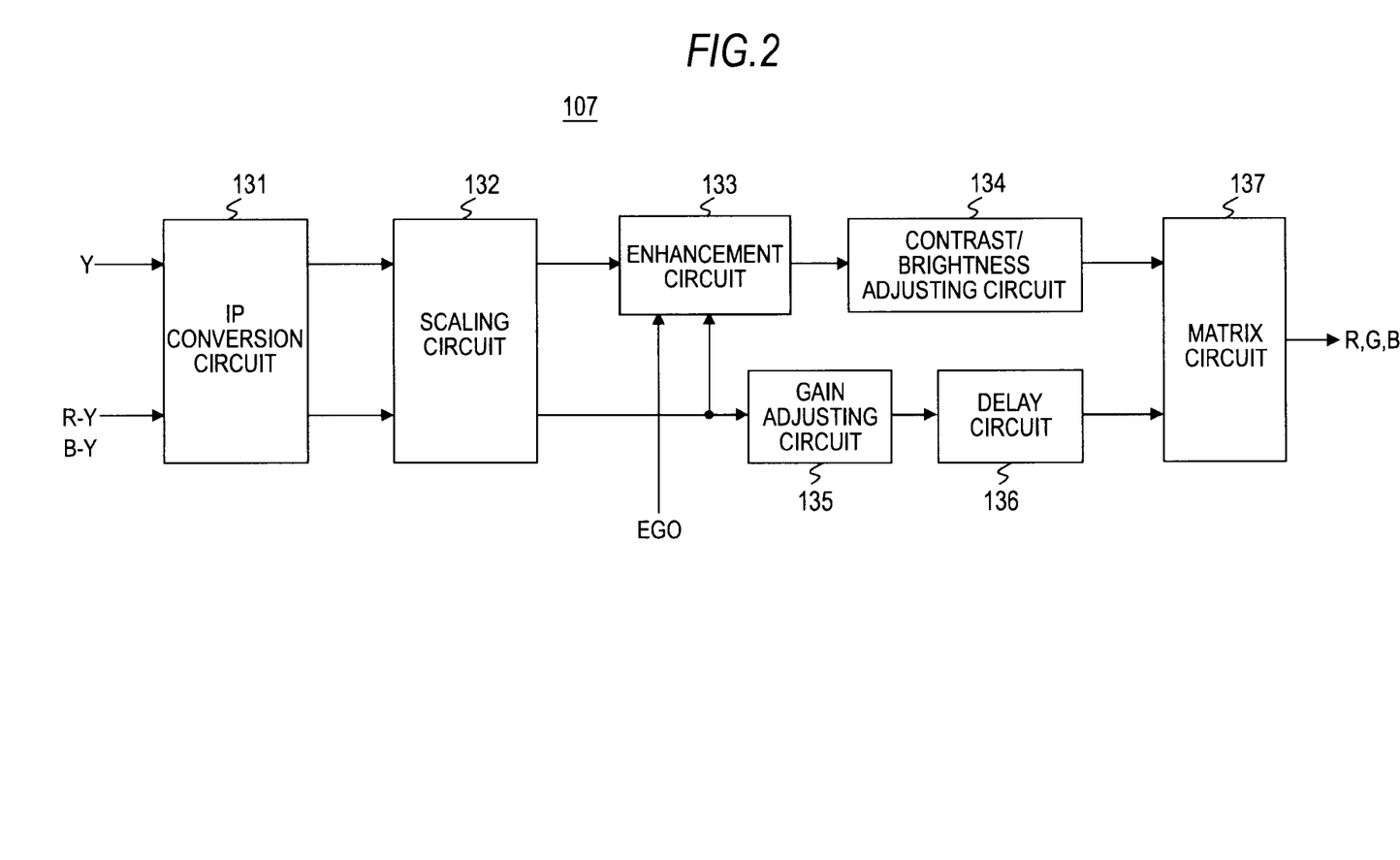
FIG. 2 is a block diagram showing an exemplary configuration of a video process circuit forming part of the television receiver.

FIG. 2 shows an exemplary configuration of the video process circuit 107. The video process circuit 107 includes an IP conversion circuit 131, a scaling circuit 132, an enhancement circuit 133, a contrast/brightness adjusting circuit 134, a gain adjusting circuit 135, a delay circuit 136, and a matrix circuit 137.

The IP conversion circuit 131 converts luminance data (luminance signals) Y and chrominance data (color signals) R-Y and B-Y, which are interlace signals output from the MPEG decoder 106 (see FIG. 1), into progressive signals. The scaling process section 132 performs a scaling process on the luminance data Y and the chrominance data R-Y and B-Y output from the IP conversion circuit 131 to display the data at a resolution suitable for the display panel 109.

The enhancement circuit 133 performs an enhancement process on the luminance data Y output from the scaling circuit 132 to improve the sharpness of the image. The enhancement circuit 133 obtains an enhancement gain EG0' of each pixel on a real-time basis by multiplying an enhancement gain EG0, which is determined in advance through an operation performed by the user, by a weighting coefficient. The weighting coefficient depends on the mean deviation of luminance values of a plurality of pixels included in a predetermined region surrounding the pixel of interest. In a flat region, since the mean deviation has a small value, a small value is obtained as the enhancement gain EG0' of each pixel included in the region.

The enhancement circuit 133 detects blue regions based on the chrominance data R-Y and B-Y output from the scaling circuit 132. The enhancement circuit 133 performs an enhancement process using enhancement gains EG0' controlled by mean deviations as described above in the blue regions and using enhancement gains EG0 determined in advance as described above in regions in the other colors. Details of the enhancement circuit 133 will be described later.

The contrast/brightness adjusting circuit 134 performs a process of adjusting the contrast and brightness of the luminance data Y output from the enhancement circuit 133 based on operations performed by the user. The gain adjusting circuit 135 performs a process of adjusting the gain of the chrominance data R-Y and B-Y output from the scaling circuit 132 based on operations performed by the user. The delay circuit 136 performs a process of delaying the chrominance data R-Y and B-Y output from the gain adjusting circuit 135 to time those pieces of data with the luminance data Y.

The matrix circuit 137 performs a process of matrixing the luminance data Y output from the contrast/brightness adjusting circuit 134 and the chrominance data R-Y and B-Y output from the delay circuit 136 to output data of three primary colors red (R), green (G), and (B). The three primary color data R, G, and B are supplied to the panel driving circuit (see FIG. 1)/

[Exemplary Configuration of Enhancement Circuit]

Figure 3:
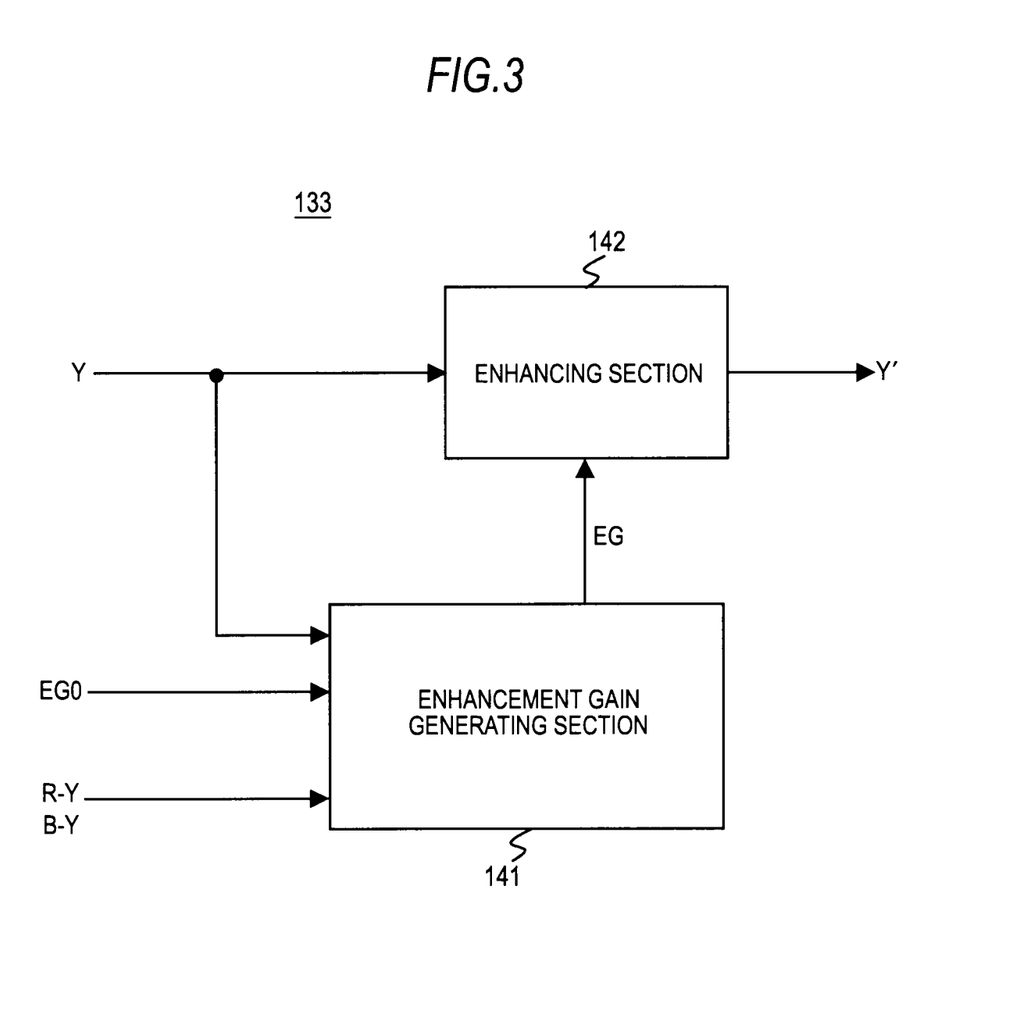
FIG. 3 is a block diagram showing an exemplary configuration of an enhancement circuit forming part of the video process circuit.

FIG. 3 shows an exemplary configuration of the enhancement circuit 133. The enhancement circuit 133 includes an enhancement gain generating section 141 and an enhancing section 142. The enhancement gain generating section 141 obtains an enhancement gain EG for each pixel based on luminance data Y, an enhancement gain EG0 determined in advance through an operation of a user, and chrominance data R-Y and B-Y. The enhancing section 142 performs a process of enhancing the luminance data Y based on the enhancement gain EG for each pixel obtained by the enhancement gain generating section 141 and outputs processed luminance data Y'.

Figure 4:
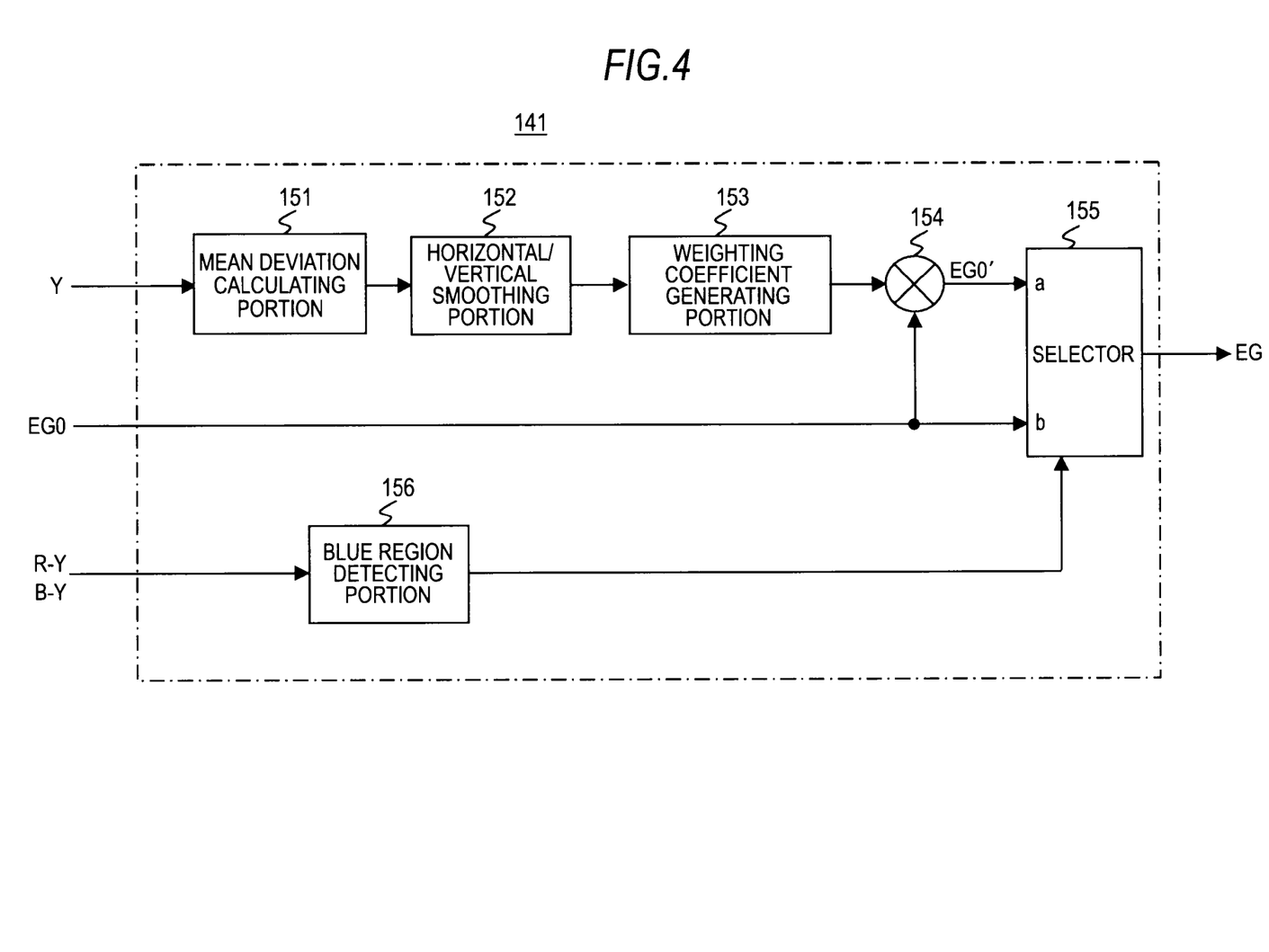
FIG. 4 is a block diagram showing an exemplary configuration of an enhancement gain generating section forming part of the enhancement circuit.

FIG. 4 shows an exemplary configuration of the enhancement gain generating section 141. The enhancement gain generating section 141 includes a mean deviation calculating portion 151, a horizontal/vertical smoothing portion 152, a weighting coefficient generating portion 153, a multiplication portion 154, a selector 155, and a blue region detecting portion 156.

Figure 5:
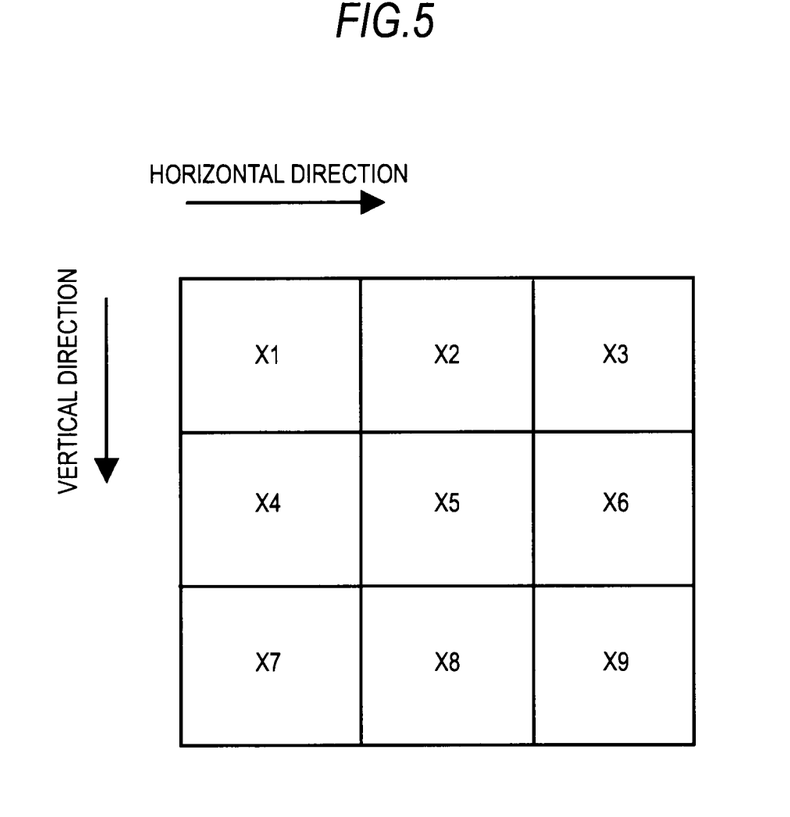
FIG. 5 is an illustration showing an example of a predetermined region centered at a pixel of interest, a mean deviation of luminance values being calculated in the region.

The mean deviation calculating portion 151 sequentially performs a calculation as described below for each pixel picked up as a pixel of interest to which an enhancement gain is to be obtained. Specifically, the calculating portion calculates the mean deviation of luminance values of a plurality of pixels included in a predetermined region around the pixel of interest. For example, the predetermined region may be a rectangular region centered at the pixel of interest and ranging n pixels in the horizontal direction and m pixels in the vertical direction. FIG. 5 shows an example of such a predetermined region, and the example is a rectangular region ranging three pixels in the horizontal direction and three pixels in the vertical direction and centered at a pixel X5 that is the pixel of interest.

The mean deviation calculating portion 151 calculates a mean deviation according to Expression 1 shown below. In this example, a mean deviation is calculated for a predetermined region which is a rectangular region ranging n pixels in the horizontal direction and m pixels in the vertical direction. "Xi" in the expression represents the luminance value of a pixel Xi. "s" represents the sum of 1 to (n×m).

$$\text{mean deviation} = 1/(n \times m) \cdot \text{absolute value of } \Sigma\{Xi - [\text{average value of}(n \times m)]\} \quad (1)$$

The horizontal/vertical smoothing portion 152 smoothes the mean deviations obtained by the mean deviation calculating portion 151 in the horizontal and vertical directions. The horizontal/vertical smoothing portion 152 is formed by a horizontal low-pass filter and a vertical low-pass filter. Even when there is an abrupt change in a mean deviation obtained by the mean deviation calculating portion 151, such a change can be suppressed by the horizontal/vertical smoothing portion 152.

Figure 6A:
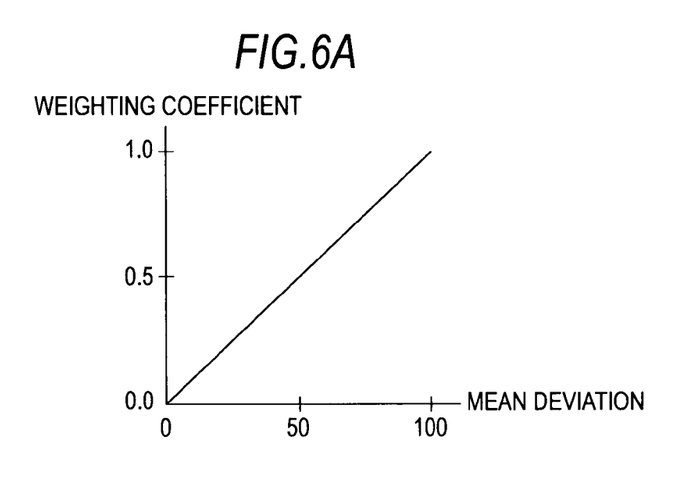
FIGS. 6A, 6B, and 6C are graphs showing examples of correspondence or relationship between mean deviations and weighting coefficients, referred to by the enhancement gain generating portion.
Figure 6B:
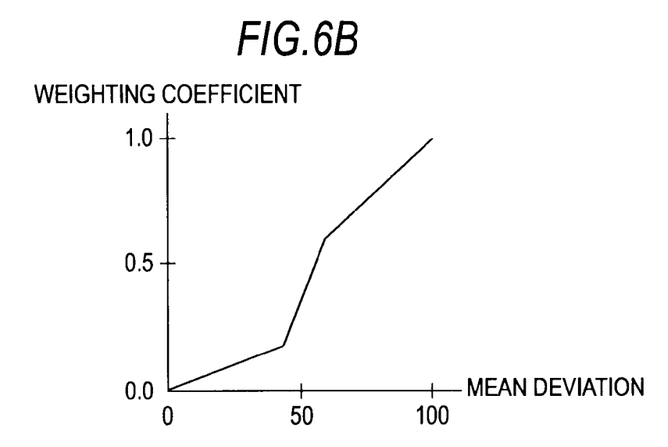
Figure 6C:
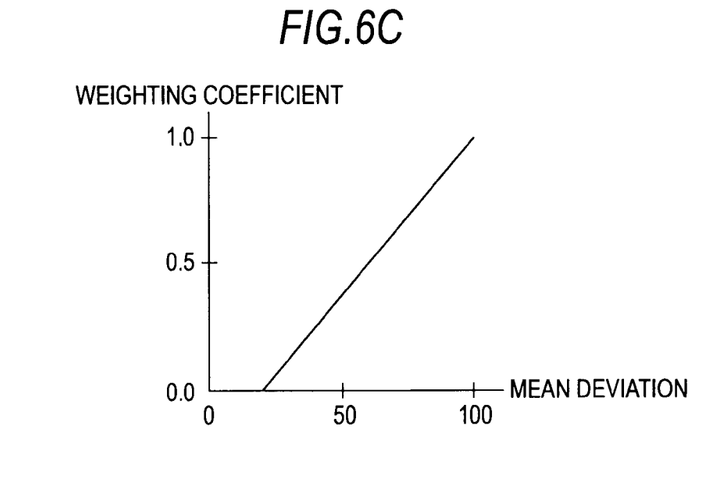

The weighting coefficient generating portion 153 generates a weighting coefficient for each pixel of interest according to the values of the mean deviations obtained by the smoothing at the horizontal/vertical smoothing portion 152. FIG. 6A shows correspondence between mean deviations and weighting coefficients. A weighting coefficient has a value in the range from 0.0 to 1.0. A weighting coefficient applied to a mean deviation has a greater value, the greater the value of the mean deviation. The invention is not limited to the example shown in FIG. 6A, and mean deviations and weighting coefficients may alternatively have correspondence or relationship as shown in FIG. 6B or 6C by way of example.

The multiplication portion 154 multiplies an enhancement gain EG0 determined in advance through a user operation by a weighting coefficient for each pixel generated by the weighting coefficient generating portion 153 to obtain an enhancement gain for the pixel or an enhancement gain EG0' which is controlled on a real-time basis according to a mean deviation.

Figure 7:
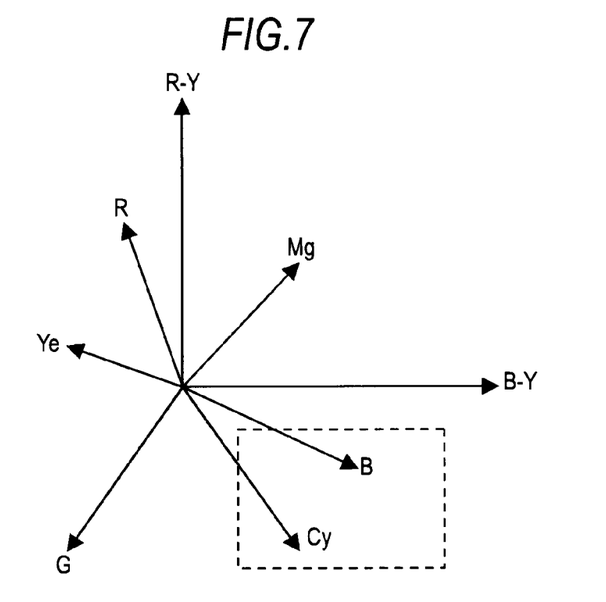
FIG. 7 is an illustration showing relationships between the phases of chrominance data R-Y and B-Y and various colors, i.e., red (R), green (G), blue (B), yellow (Ye), cyan (Cy), and magenta (Mg)

The blue region detecting portion 156 detects blue regions based on chrominance data R-Y and B-Y. The blue region detecting portion 156 sequentially checks each pixel as a pixel of interest for which an enhancement gain is to be obtained to determine whether the pixel of interest resides on a blue region. FIG. 7 shows relationships between the phases of the chrominance data R-Y and B-Y and red (R), green (G), blue, yellow (Ye), cyan (Cy), and magenta (Mg). The blue region detecting portion 156 determines that a pixel of interest is in a blue region when the chrominance data R-Y and B-Y of the pixel of interest reside in the rectangular region represented by a broken line in FIG. 7.

The enhancement gain EG0' of each pixel obtained by the multiplication portion 154 is input to a side a of the selector 155, and the predetermined enhancement gain EG0 is input to a side b of the selector. The selector 155 selectively picks up the enhancement gain EG0' or EG0 based on the a detection signal from the blue region detecting portion 156 and outputs the selected gain as an enhancement gain EG. The selector 155 outputs the enhancement gain EG0' as the enhancement gain EG in blue regions and outputs the enhancement gain EG0 as the enhancement gain EG in regions of other colors.

Operations of the enhancement gain generating section 141 shown in FIG. 4 will now be described. Input luminance data Y obtained by the scaling circuit 132 (see FIG. 2) is supplied to the mean deviation calculating portion 151. The mean deviation calculating portion 151 sequentially performs a calculation for each pixel picked up as a pixel of interest to which an enhancement gain is to be obtained. Specifically, the calculating portion calculates the mean deviation of luminance values of a plurality of pixels included in a predetermined region around the pixel of interest.

The mean deviations of the pixels sequentially calculated by the mean deviation calculating portion 151 are smoothed in the horizontal and vertical directions by the horizontal/vertical smoothing section 152 and are thereafter supplied to the weighting coefficient generating portion 153. At the weighting coefficient generating portion 153, weighting coefficients to be applied to the pixels respectively are sequentially generated according to the smoothed values of the mean deviations.

The weighting coefficients for the respective pixels sequentially generated at the weighting coefficient generating portion 153 are supplied to the multiplication portion 154. An enhancement gain EG0 determined in advance through the user operation or the like is supplied to the multiplication portion 154 from, for example, the CPU 121 (see FIG. 1). The multiplication portion 154 multiplies the enhancement gain EG0 by a weighting coefficient to obtain an enhancement gain EG0' for the pixel which is controlled on a real-time basis according to a mean deviation.

Input chrominance data R-Y and B-Y obtained by the scaling circuit 132 are supplied to the blue region detecting portion 156. The blue region detecting portion 156 detects blue regions based on chrominance data R-Y and B-Y by determining whether each pixel resides in a blue region or not.

The enhancement gain EG0' of each pixel obtained by the multiplication portion 154 is input to the side a of the selector 155, and the predetermined enhancement gain EG0 is input to the side b of the selector. Detection signals from the blue region detecting portion 156 are also supplied to the selector 155 as selection control signals. For a blue region, the selector 155 picks up the enhancement gain EG0' to output it as an output enhancement gain EG. For regions of other colors, the selector 155 picks up the enhancement gain EG0 to output it as the output enhancement gain EG.

Figure 8:
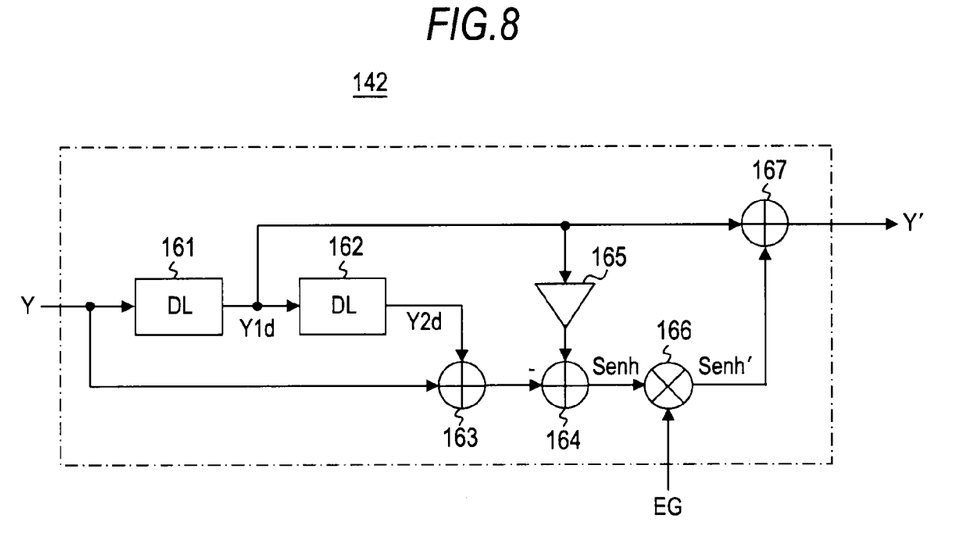
FIG. 8 is a block diagram showing an exemplary configuration of an enhancing section forming part of the enhancement circuit.

FIG. 8 shows an exemplary configuration of the enhancing section 142. The enhancing section 142 includes delay elements 161 and 162, an adder 163, a subtractor 164, an amplifier 165, a multiplier 166, and an adder 167.

Figures 9A, 9B, 9C:
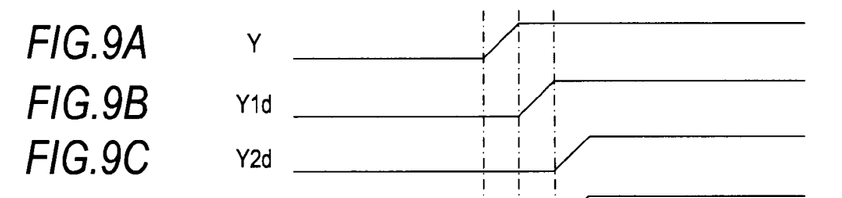
FIGS. 9A to 9E are graphs showing examples of signal waveforms of various parts of the enhancement circuit.

The input luminance data Y (see FIG. 9A) obtained by the scaling circuit 132 (see FIG. 2) are supplied to the adder 163 through a series circuit formed by the delay elements 161 and 162. The luminance data Y are also directly supplied to the adder 163. The adder 163 adds luminance data $Y2d$ (see FIG. 9C) output from the delay element 162 and the input luminance data Y.

Figure 9D:
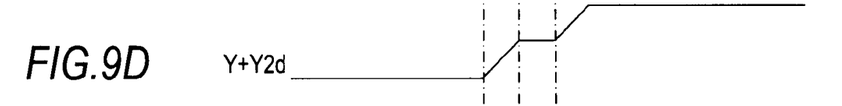
Figure 9E:
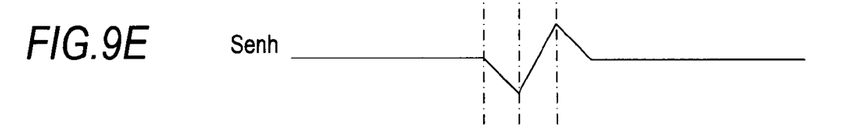

Output data $Y+Y2d$ (see FIG. 9D) from the adder 163 are supplied to the subtractor 164. Luminance data $Y1d$ (see FIG. 9B) output from the delay element 161 are amplified two-fold by the amplifier 165 and are thereafter supplied to the subtractor 164. At the subtractor 164, the output data $Y+Y2d$ from the adder 163 is subtracted from data $2*Y1d$ output by the amplifier 165 to obtain an enhancement signal component Senh (see FIG. 9E).

The enhancement signal component Senh obtained by the subtractor 164 is supplied to the multiplier 166. The enhancement gain EG obtained by the above-described enhancement gain generating section 141 is supplied to the multiplier 166. The multiplier 166 multiplies the enhancement signal component Senh by the enhancement gain EG to obtain an enhancement signal component Senh' to be added to the luminance data. In this case, the enhancement signal component Senh' has a higher level, the greater the enhancement gain EG.

The enhancement signal component Senh' obtained by the multiplier 166 is supplied to the adder 167. The luminance data $Y1d$ output from the delay element 161 are supplied to the adder 167 as luminance data to be enhanced. At the adder 167, the enhancement signal component Senh' is added to the luminance data $Y1d$ to obtain enhanced output luminance data Y'.

Figure 10:
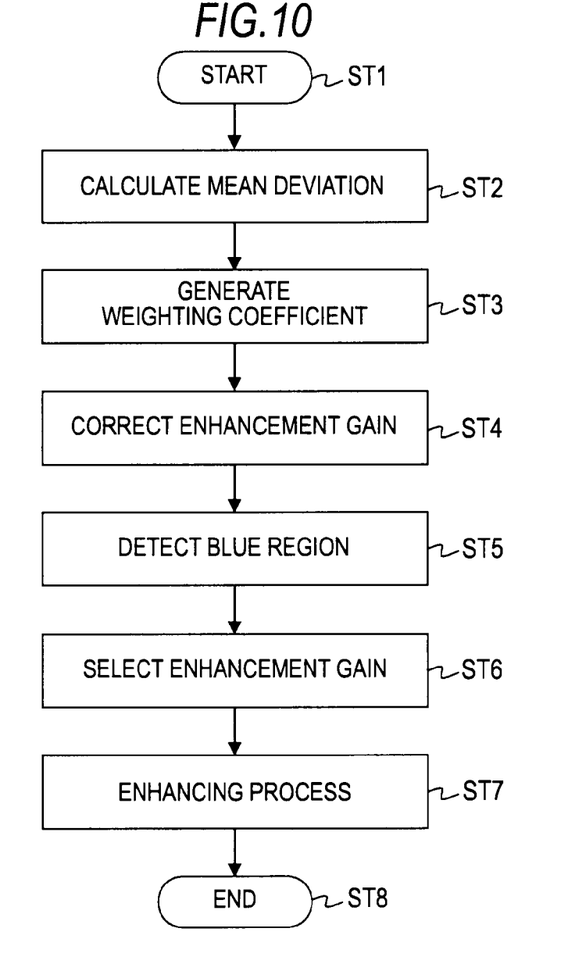
FIG. 10 is a flow chart showing steps of processing one pixel (pixel of interest) performed by the enhancement circuit.

Operations of the enhancement circuit 133 shown in FIGS. 3, 4, and 8 will now be described with reference to the flow chart shown in FIG. 10. The flow chart in FIG. 10 shows steps performed by the enhancement circuit 133 to process one pixel (pixel of interest).

At step ST1, the enhancement circuit 133 starts the process. At step ST2, the mean deviation calculating portion 151 of the enhancement gain generating section 141 in the enhancement circuit 133 calculates the mean deviation of luminance values of a plurality of pixels included in a predetermined region centered at the pixel of interest. At step ST3, the weighting coefficient generating portion 153 of the enhancement gain generating section 141 in the enhancement circuit 133 generates a weighting coefficient for the pixel of interest according to the value of the mean deviation of the pixel of interest calculated at step ST2.

At step ST4, the multiplication portion 154 of the enhancement gain generating section 141 in the enhancement circuit 133 corrects the predetermined enhancement gain EG0 using the weighting coefficient generated at step ST3. Specifically, the multiplication portion 154 of the enhancement circuit 133 multiplies the predetermined enhancement gain EG0 by the weighting coefficient generated at step ST3 to obtain an enhancement gain EG0' controlled on a real-time basis according to the mean deviation to be applied to the pixel of interest.

At step ST5, the blue region detecting portion 156 of the enhancement gain generating section 141 in the enhancement circuit 133 performs detection of a blue region by determining whether the pixel of interest resides in a blue region. At step ST6, the selector 155 of the enhancement gain generating section 141 in the enhancement circuit 133 selects the final enhancement gain to be used.

At this time, based on a signal indicating the result of the blue region detection at step ST5, the selector 155 selects the enhancement gain EG0' for the pixel of interest controlled on a real-time basis according to the mean deviation obtained at step ST4 or the predetermined enhancement gain EG0. Specifically, the enhancement gain EG0' is selected when the pixel is in a blue region, and the enhancement gain EG0 is selected when the pixel is in a region of a different color.

At step ST7, the enhancing section 142 of the enhancement circuit 133 performs a process of enhancing the luminance data of the pixel of interest. In this case, the enhancing section 142 generates an enhancement signal component Senh and multiplies the enhancement signal component Senh by the enhancement gain EG selected at step ST6 to obtain an enhancement signal component Senh' to be added to the luminance data. The enhancing section 142 adds the enhancement signal component Senh' to the luminance data.

After step ST7, the enhancement circuit 133 terminates the process at step ST8.

The enhancement gain generating section 141 of the enhancement circuit 133 shown in FIG. 3 generates an enhancement gain EG0' for each pixel. The enhancement gain EG0' is obtained by controlling the predetermined enhancement gain EG0 on a real-time basis according to the mean deviation of luminance values of a plurality of pixels included in a predetermined region centered at the pixel. For example, an enhancement gain EG0' for a pixel in a flat region is small because such a region has a small mean deviation and a small weighting coefficient is therefore applied.

The selector 155 of the enhancement circuit 133 shown in FIG. 3 selects an enhancement gain EG0' controlled on a real-time basis according to a mean deviation or a predetermined enhancement gain EG0 according to a detection signal from the blue region detecting portion 156. Specifically, the enhancement gain EG0 is selected for a blue region, and the enhancement gain EG0 is selected for a region in a different color. The selected gain constitutes an output enhancement gain EG.

In the enhancement circuit 133 shown in FIG. 3, an enhancement gain EG0' is used when the enhancing process at the enhancing section 142 is performed for a blue and flat region such as a region representing blue sky in an image, and the enhancement gain EG0' has a small value. Therefore, the enhancing process is prevented from emphasizing noises in such a region.

In the enhancement gain generating section 141 of the enhancement circuit 133 shown in FIG. 3, mean deviations obtained by the mean deviation calculating portion 151 are supplied to the weighting coefficient generating portion 153 after being smoothed in the horizontal and vertical directions by the horizontal and vertical smoothing portion 152. Therefore, even when there is an abrupt change in a mean deviation obtained by the mean deviation calculating portion 151, such a difference is suppressed by the smoothing, and a change in the weighting coefficient obtained by the weighting coefficient generating portion 153 is also suppressed. Thus, a change in the enhancement gain EG0' obtained by the multiplication portion 154 is suppressed, and the operations of the circuit associated with the enhancement process can be performed in a stable manner.

2. Modification

In the above-described embodiment, the enhancement gain generating section 141 shown in FIG. 4 is configured to output an enhancement gain EG0' or an enhancement gain EG0 as an enhancement gain EG based on a detection signal from the blue region detecting portion 156. The enhancement gain generating section may alternatively be configured such that an enhancement gain EG0' or an enhancement gain EG0 is selected and output as an enhancement gain EG, for example, as a result of operations performed by the user. In this case, when the enhancement gain EG0' is selected, the enhancing section 142 uses the enhancement gain EG0' as the enhancement gain EG not only for blue regions but also for all other regions in different colors. As a result, noise can be prevented from being emphasized by the enhancing process in flat regions regardless of the color of the regions.

In the above-described embodiment, the enhancement gain generating section 141 shown in FIG. 4 is configured to output an enhancement gain EG0' or an enhancement gain EG0 as an enhancement gain EG based on a detection signal from the blue region detecting portion 156. Alternatively, the blue region detecting portion 156 may be replaced with a portion for detecting regions in one or a plurality of colors other than blue, and the selection performed by the selector 155 may be controlled based on a detection signal from such a detecting portion.

In the above embodiment, the enhancement circuit 133 shown in FIG. 3 (the enhancement gain generating section 141 and the enhancing section 142) has been described as being implemented on a hardware basis. Alternatively, some or all of the processes at the enhancement circuit 133 may be implemented on a software basis. In this case, in a computer including a CPU, a ROM, a RAM and the like, programs of the processes stored in the ROM may be deployed on the RAM and executed by the CPU.

The embodiment of the invention makes it possible to prevent noises from being emphasized as a result of an enhancement process in a flat region such as a region representing blue sky in an image, and the embodiment may be used as, for example, an enhancement circuit of a television receiver.

The present application contains subject matter related to that disclosed in Japanese Priority Patent Application JP 2009-186923 filed in the Japan Patent Office on Aug. 11, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A video signal processing apparatus, comprising:
an enhancement gain generating section configured to obtain an enhancement gain for each pixel based on a luminance signal forming part of an input video signal and a predetermined enhancement gain; and an enhancing section configured to perform a process of enhancing the luminance signal forming part of the input video signal based on the enhancement gain for each pixel obtained by the enhancement gain generating section, wherein the enhancement gain generating section includes
- a mean deviation calculating portion configured to obtain a mean deviation of luminance values of a plurality of pixels included in a predetermined region centered at a pixel of interest that is the pixel for which the enhancement gain is to be obtained,
- a weighting coefficient generating portion configured to generate a weighting coefficient for the pixel of interest according to the value of the mean deviation calculated by the mean deviation calculating portion, and
- a multiplication portion that multiplies the predetermined enhancement gain by the weighting coefficient generated by the weighting coefficient generating portion to obtain the enhancement gain for the pixel of interest.

2. The video signal processing apparatus according to claim 1, wherein the enhancement gain generating section includes:
- a color region detecting portion configured to detect a region of a predetermined color in the input video signal based on a color signal forming part of the input video signal; and
- an output selecting portion that picks up and outputs the enhancement gain obtained by the multiplication portion for the region of the predetermined color and that picks up and outputs the predetermined enhancement gain for a region other than the region of the predetermined color, depending on a detection signal from the color region detecting portion.

3. The video signal processing apparatus according to claim 1, wherein the enhancement gain generating section further includes
- a smoothing portion that smoothes the mean deviation calculated by the mean deviation calculating portion in the horizontal direction and the vertical direction; and the weighting coefficient generating portion generates the enhancement gain for the pixel of interest according to the value of the mean deviation smoothed by the smoothing portion.

4. A method of generating an enhancement gain, comprising:
- obtaining a mean deviation of luminance values of a plurality of pixels included in a predetermined region centered at a pixel of interest that is a pixel for which an enhancement gain is to be obtained;
- generating a weighting coefficient for the pixel of interest according to the value of the mean deviation obtained by the obtaining; and
- multiplying a predetermined enhancement gain by the weighting coefficient generated by the generating to obtain the enhancement gain for the pixel of interest.

5. A computer-readable storage medium encoded with a program for causing a computer to execute a method of generating an enhancement gain, comprising:
- obtaining a mean deviation of luminance values of a plurality of pixels included in a predetermined region centered at a pixel of interest that is a pixel for which an enhancement gain is to be obtained;
- generating a weighting coefficient for the pixel of interest according to the value of the mean deviation obtained by the obtaining; and
- multiplying a predetermined enhancement gain by the weighting coefficient generated by the generating to obtain the enhancement gain for the pixel of interest.

* * * * *